United States Patent [19]

Sergev et al.

[11] 4,264,362
[45] Apr. 28, 1981

[54] SUPERCORRODING GALVANIC CELL ALLOYS FOR GENERATION OF HEAT AND GAS

[75] Inventors: Sergius S. Sergev; Stanley A. Black; James F. Jenkins, all of Ventura, Calif.

[73] Assignee: The United States of America as represented by the Secretary of the Navy, Washington, D.C.

[21] Appl. No.: 66,200

[22] Filed: Aug. 13, 1979

Related U.S. Application Data

[63] Continuation-in-part of Ser. No. 855,035, Nov. 25, 1977, abandoned.

[51] Int. Cl.$^3$ .......................... C22B 1/05; C09K 3/00; C01B 3/08; B22F 1/00
[52] U.S. Cl. ...................................... 75/243; 75/245; 75/246; 75/249; 252/188; 252/188.3 R; 423/657; 423/658; 428/570
[58] Field of Search ............... 428/550, 548; 252/188, 252/188.3; 423/657, 658; 75/249, 243, 246, 245

[56] References Cited

U.S. PATENT DOCUMENTS

| 3,591,362 | 7/1971 | Benjamin | 428/570 X |
| 3,942,511 | 3/1976 | Black et al. | 252/188 T |
| 3,993,577 | 11/1976 | Black et al. | 252/188 |
| 4,017,414 | 4/1977 | Black et al. | 252/188 |

*Primary Examiner*—Richard E. Schafer
*Attorney, Agent, or Firm*—Richard S. Sciascia; Joseph M. St. Amnand

[57] ABSTRACT

Supercorroding magnesium alloys that operate like galvanic cells and react rapidly and predictably with seawater to produce heat and hydrogen gas. The alloys are formed by a mechanical process that bonds magnesium and noble metal powder particles together in a strong electrical and mechanical bond. The alloy powders can be compacted and sintered to form barstock, etc., suitable for making self-destructing corroding links.

20 Claims, 22 Drawing Figures

LIGHT AREA (ACTIVE METAL)
DARK AREAS (PASSIVE METAL)

Fig. 1

Fig. 2. EFFECTS OF TEMPERATURE AND ELECTRODE GAP ON POWER DENSITY. SOME MINIMUM GAP MUST BE MAINTAINED IN ORDER FOR REACTION PRODUCTS TO BE REMOVED FROM BETWEEN THE ELECTRODES BY ELECTROLYTE CIRCULATION.

Fig. 13. BUOYANCY OF GASES AT AN OCEAN DEPTH OF 6,090m (20,000 FT.)

Fig. 21.

Fig. 14. RESIDUAL BUOYANCY (WEIGHT OF DISPLACED WATER-WEIGHT OF ALLOY) AS A FUNCTION OF DEPTH

SUPERCORRODING GALVANIC CELL ALLOYS FOR GENERATION OF HEAT AND GAS

This is a continuation-in-part of U.S. Patent Application Ser. No. 855,035 filed Nov. 25, 1977, now abandoned.

BACKGROUND OF THE INVENTION

This invention generally relates to alloys which operate as short-circuited galvanic cells to corrode rapidly in electrolyre such as seawater. Such an alloy is suitable as a heat source; as a gas generator; or as a corroding release link.

Sources of heat and hydrogen gas of various types are well known in the art, especially by virtue of earlier already issued United States Patents commonly assigned herewith such as: U.S. Pat. No. 3,884,216 issued May 20, 1975 for *ELECTROCHEMICAL ENERGY SOURCE FOR DIVER SUIT HEATING;* U.S. Pat. No. 3,942,511 issued Mar. 9, 1976 for *SANDWICHED STRUCTURE FOR PRODUCTION OF HEAT AND HYDROGEN GAS;* U.S. Pat. No. 3,993,577 issued Nov. 23, 1976 for *METHOD FOR PRODUCTION OF HEAT AND HYDROGEN GAS;* and, U.S. Pat. No. 4,017,414 issued Apr. 12, 1977 for *POWERED METAL SOURCE FOR PRODUCTION OF HEAT AND HYDROGEN GAS.*

At least two methods have been employed in the past to achieve high corrosion rates. One is to construct a short-circuited battery-like cell of noble and active metal plates separated by an electrode gap such as disclosed in aforementioned U.S. Pat. No. 3,884,216. Another method is to form a powder by mechanically joining the discrete particles of noble and active powders such as disclosed in aforementioned U.S. Pat. Nos. 3,942,511, 3,993,577 and 4,017,414 where each powder particle is a small galvanic cell.

The battery-like cell has two principal disadvantages: the power output is dependent upon the electrode gap (internal cell resistance) and the resistance in the electrical short circuits (external load) limits the reaction rate. In order to maximize power output, the electrode gap must approach zero. Yet, to sustain the reaction, reaction products must be flushed away from the reacting surfaces. This requires a small initial gap between the plates. The gap creates high internal cell resistance which reduces the power obtainable from the cell. A further decline in power occurs because of the gap increase as the active plate is consumed.

The resistance in the electrical short circuit between the noble and active materials can limit power output. To maximize output, the external short circuit resistance must be minimized. In the battery like configuration the resistance is kept low by providing several relatively short-length paths between the plates. Low resistance spacers are used to maintain the electrode gap. Thus, the electrical resistance is minimized within the configuration and material limits.

In the powdered form where each grain of powder is a small galvanic cell similar to the larger battery-like cell, noble metal particles are mechanically joined to the surface of an active metal particle, as disclosed in aforementioned U.S. Pat. No. 4,017,414. The combination retains the property and identity of each constituent. But each cell will react with itself, so no electrode gap is necessary or exists. The short circuit path length is minimized because the particles are in direct contact. However, the short circuit resistance is not minimized. Electrical resistance between individual particles is a function both of physical proximity and of the oxides that exist on the bond surface between the metal particles (this is also true for the battery-like configuration). Because high resistance surface oxides are present, excellent mechanical contact may not assure intimate electrical contact. Due to the random method of joining the particles and low energy level of the balls used in the milling process in the aforesaid patent, some metal particles may not be paired into micro-cells but may remain free and will not react at all. Also, in this prior art powder form, the internal cell resistance may be minimized but the external or load resistance may be high. Due to the high oxide level on the bond surface, compacting and sintering the powders fabricated by using the prior art teachings will not result in barstock, etc., which has any significant mechanical strength.

A strong mechanical and electrical bond is necessary to provide a rapidly corroding galvanic cell alloy.

SUMMARY

The supercorroding galvanic cell alloy (of this invention) is formed from a noble metal and an active metal, or more than two constituents can be used. The metals can be the same as used in the battery-like or powder configurations, or other metals may be used. In any case, the constituents are chosen based on their ability to form an alloy which will corrode at a predictable rate in the available electrolyte. In particular, an alloys that will react in seawater like a galvanic cell can be made using magnesium and a noble metal such as iron or nickel. Any of the usual methods can be employed in producing the alloy: conventional dissolution, mechanical alloying, etc. The proportions, particle size, and the homogeneity are selected to control the reaction rate. A maximum reaction rate can be achieved at some particular mixture proportions. The resulting alloy is used in either plate, bar or powder form. The plate and powder forms are especially suited for use as a heat source or a gas generator. A corroding release link can be fabricated from sintered barstock. The supercorroding alloys are superior to previous similar methods for producing heat and gas.

Usually alloys are formed to resist corrosion. However, the alloy of this invention is specifically intended to operate like a short-circuited galvanic cell for use as a rapidly corroding alloy. By alloying the desired metal constituents, the two main disadvantages of previous methods of producing high corrosion rates are eliminated. The alloy can have properties different from either of the constituents. Since the alloy is a uniform mixture of the metals in intimate contact with each other, there is no electrode gap to maintain so internal cell resistance is minimized and the electrical short circuit resistance will be substantially a function only of the path length between the centers of the reacting masses.

Since no electrode gap exists, the power output of a heat source constructed of the alloy in plate form in the short-circuited battery configuration will not decline as the space between the plates increases due to material consumption. A fluid circulation space will still have to exist, however, to flush away reaction products. Electrical resistance is the minimum attainable due to the extremely short current lengths and because of the intimate contact and strong mechanical bond, i.e., the alloying, as disclosed herein, minimizes external resistance.

In the powdered form of the alloy all of the metal particles are coupled into micro-cells because of the completely uniform mixture of the alloy constituents. Again, the electrical contact is the optimum attainable.

This supercorroding galvanic cell alloy has the additional feature of being suitable for use as corroding barstock. In this form, corroding links can be made for use either as primary or backup releases for oceanographic instruments. By adjusting the alloy composition, the reaction rates, and thus the release time, can be controlled.

DESCRIPTION OF PREFERRED EMBODIMENT

A family of short-circuited galvanic cells formed from supercorroding magnesium alloys that react spontaneously and vigorously with seawater to produce heat and hydrogen gas have been developed. The galvanic cell alloys have been developed as a self-contained heat source for Navy diver use, but they may also be used to generate hydrogen gas for buoyancy, thermodynamic engines, and fuel cells. Because of their uniform and predictable behavior, the alloys can be used as corroding links to retrieve oceanographic equipment.

Various cathodic materials in different proportions have been alloyed with magnesium. Tests were conducted to determine how the reaction is affected by alloy compositions and constituent proportions, temperature, and pressure.

In general, magnesium reacts with seawater according to the formula:

$$Mg + 2H_2O \rightarrow Mg(OH)_2 + H_2 + \text{heat}$$

Figure 1:
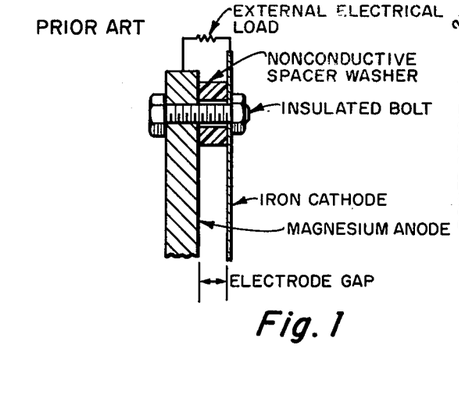
FIG. 1 shows a typical dual plate (prior art type) battery cell.
Figure 2:
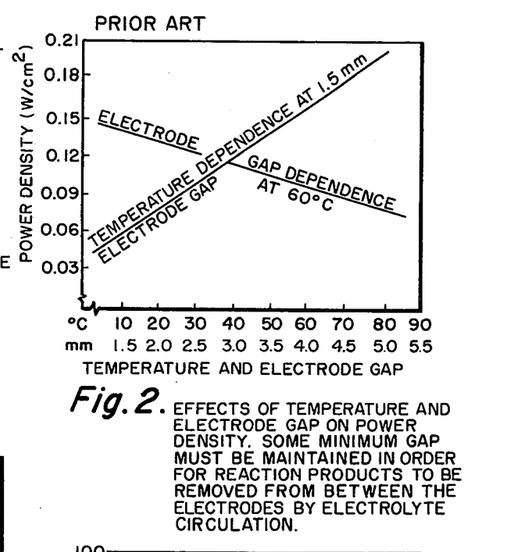
FIG. 2 shows the effects of temperature and electrode gap on power density, for a cell such as in FIG. 1.

The reaction has a theoretical energy density of 14.929 kJ/kg (1885 W-h/lb) and produces 0.921 liter of gas per gram of magnesium (14.8 ft$^3$/lb) at STP. By itself, magnesium corrodes slowly in seawater because of low, local potential differences within the magnesium. When a suitable cathodic material is brought into close proximity and electrically connected with the magnesium, a battery is formed, and the corrosion reaction proceeds rapidly. The dual plate cell shown in FIG. 1 represents this configuration. With the electrical load replaced by a short circuit, the reaction proceeds even more rapidly, and the cell efficiently produces heat and hydrogen gas. The rate of reaction is known to be a function of (1) electrolyte temperature, pH, salinity, and density, (2) anode cathode plate spacing, and (3) ambient pressure. The effects of temperature and spacing on dual-plate cell performance are shown in FIG. 2. Some minimum gap must be maintained in order for reaction products to be removed from between the electrodes by electrolyte circulation.

A diver heater, based on the short-circuited dualplate cell, was built and tested. The cell consisted of alternate magnesium and iron plates spaced apart by copper washers that provided the short circuit. One of the main drawbacks to this construction is that as magnesium is consumed, the electrode gap increases and power output declines.

To eliminate this decline and to achieve faster reaction rates, powdered metal mini-cells were conceived as discussed in aforementioned U.S. Pat. No. 4,017,414. The mini-cells were fabricated by ball-milling a mixture of iron and magnesium powders (using lightweight ceramic balls). The milling produced composite particles by mechanically bonding the constituents together.

Later tests showed that accelerated reaction rates were achieved using the mini-cells, but that the reaction efficiency (percentage completion) in these prior art mini-cells was much lower than predicted. The optimum rate occurred between 5 and 10 percent iron content. The accelerated reaction rate was attributed to the close proximity of the anode-cathodic pairs and the relatively large cathode surface area. The low efficiency was attributed to poor electrical contact due to oxides that exist on metal surfaces and low mechanical strength of the Mg-Fe bond, as aforementioned.

SUPERCORRODING ALLOY FORMATION

An alloying process called mechanical alloying has been used to overcome the problems that limited the prior mini-cells efficiency. Mechanical alloying generally involves a high energy ball mill and does not use an inert solvent with the powdered metal particles as disclosed in aforementioned U.S. Pat. No. 4,017,414. The active and passive metal particles are processed (i.e., mechanically alloyed) dry.

Galvanic cell alloys have been fabricated into composite particles or mico-cells with as much as 20 percent iron content using mechanical alloying techniques. Tests have shown that these magnesium-based galvanic cell alloys react several orders of magnitude faster and more sufficiently than the previous mini-cells. Because of their extremely high corrosion rate, these materials were named supercorroding alloys.

Mechanical alloys can be produced, for example, in a high-energy ball mill by repeated flattening, fracturing, and welding of the metal constituents (i.e., active and passive metal particles). The energy of the impact of colliding steel balls, with particles trapped between them, creates atomically clean particle surfaces. When these clean surfaces come in contact during collisions, they cold-weld together. An inert atmosphere in the mill prevents reoxidation of the clean surfaces. This also avoids oxide coatings on the particle surfaces which reduce galvanic cell reaction.

The tendency of powdered particles to cold-weld together predominates during the early stage of the process. As milling continues, particles get harder and more brittle, and eventually a balance results between welding and particle fracturing. Continued milling refines the particles' characteristic layered structure. The thickness of each layer in the composite particle decreases from repeated impacts.

During the early stages of the milling process the particles get larger. As milling continues particles get harder, more brittle and break apart instead of deforming; the particles structure becomes more refined and the iron particles get smaller. At some point in the milling process, further milling results in a reduction of the corrosion rate. This is probably due to the cathode material becoming so finely dispersed throughout the anode material that the ratio of cathode/anode particle surface area available for contact with the electrolyte decreases and hence the corrosion rate decreases. This point is substantially less than saturation hardness for the material. It is important to note that to maximize corrosion rate and efficiency it is necessary to: (1) provide a short electrolyte path length between anode and cathode; (2) provide a high exposed rate of surface area between cathode and anode; (3) provide a strong (welded) bond between anode-cathode pairs; and (4) provide a very low resistance (less than $10^{-4}$ ohms) path for external currents to flow through the corroding pairs.

Figure 3:
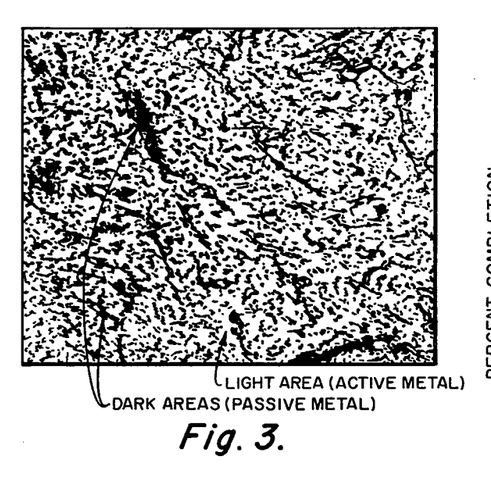
FIG. 3 is an illustration of a micrograph showing an enlarged cross sectional view of a small mechanically alloyed magnesium particle of this invention having smaller particles of iron dispersed throughout the magnesium matrix, for operation like a short-circuited galvanic cell when in an electrolyte.

The resulting mechanically alloyed powders are small particles consisting of matrices of active metal having smaller particles of passive metals dispersed throughout. The micrograph of FIG. 3 shows a cross-section of a portion of an active metal particle (e.g., magnesium) having many smaller passive metal particles (e.g., iron) dispersed within the active metal matrix. The active metal particle is shown as white and the smaller passive metal particles shown as black. Many of the passive metal particles are shown as elongated having been flattened in the milling process; the longest dimension of the active iron particles is about 30 microns. As is discussed below, the preferred powdered alloy particle size is between 80 and 100 mesh. The intimate (atomic level) contact between the alloy constituents, low electrical resistance and high ratio of exposed cathode to anode surface areas are the keys to rapid corrosion rate.

Powder alloy performance was evaluated by recording gas evolution as a function of time; this was used to determine reaction completion (energy output) and reaction rate (power).

Percentage reaction completion at a particular time is calculated from the ratio of the volume of gas produced at that time to the maximum theoretical gas production. Power is calculated essentially from the slope of the percent-completion-versus-time curve. Maximum gas production is calculated from the basic reaction equation using the actual amount of magnesium in a given weight of alloy.

A series of experiments was conducted to select an optimum milling time and particle size for further tests. Maximum reaction rate and reaction efficiency were used as a basis of evaluation. Visual observation of the reaction revealed that particles that passed through a 100-mesh sieve would not stay submerged in the seawater, but instead would float on the surface and form a foam. This resulted in reduced reaction rates. It was later observed that particles larger than 100 mesh would cycle from the bottom of the flask to the seawater surface and then sink. The cycling was caused by the formation of a hydrogen bubble which buoyed the mini-cell particle. The hydrogen bubble was shed at the surface, and the particle sank. As a result, particles that would not pass through a 100-mesh sieve were used in subsequent tests. The estimated particle size is between 80 and 100 mesh.

Various tests and experiments were conducted and many of the results are shown in the curves of FIGS. 4-11 and 13-19.

Figure 4:
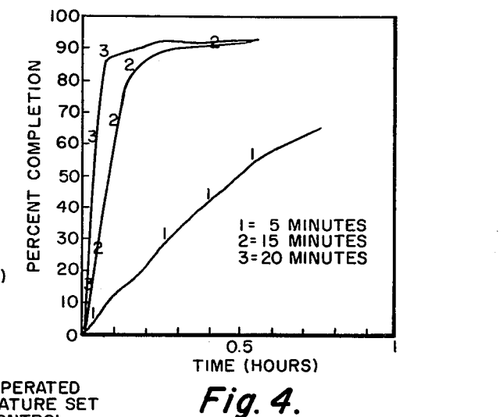
FIG. 4 are curves showing the effect of high energy milling time on reaction rate for magnesium based mechanical alloys of this invention.

As previously discussed, continued milling refines the layered structure and results in a reduction of exposed cathode surface area. To determine the effect of this refinement on the reaction rate, magnesium-based alloys of 5 atomic percent iron were milled for 5, 15 and 20 minutes each and tested. The effect of the milling time on the reaction rate shows that the longer the powders are milled, the more homogeneous they become, and the more homogeneous powders react most rapidly. Percent completion is shown in FIG. 4. The alloy milled for 20 minutes reached the highest percent completion in the least time. (The test of the alloy milled for 5 minutes were terminated prior to reaching completion, but, clearly, it reacts much more slowly.)

Figure 5:
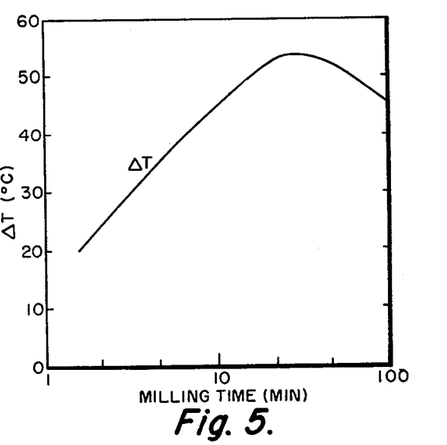
FIG. 5 shows the effect of prolonged milling on the reaction rate $\Delta T$ for the mechanically alloyed magnesium-based alloys.

Additional alloys were fabricated and tested to determine the effect of further milling on reaction rate. The time to maximum temperature rise of the water in an open beaker was recorded. FIG. 5 shows, in a general way, the effect of milling time on the reaction rate $\Delta T$. An optimum milling time occurs when the time to reach a maximum $\Delta T$ is the least. In this particular case alloys milled for 20 minutes showed the highest temperature rise in the least amount of time. Prolonged milling resulted in a reduction of the reaction rate. The reduced reaction rate is particularly attributed to a reduction in the cathode to anode surface area exposed to the electrolyte. It is expected that continued milling would result in further reduction in the reaction rate and that the reaction rate would be substantially reduced by the time that the alloy was milled to saturation hardness. Based on these results, the remaining alloys were prepared under conditions similar to the 20-minute alloy.

Figure 15:
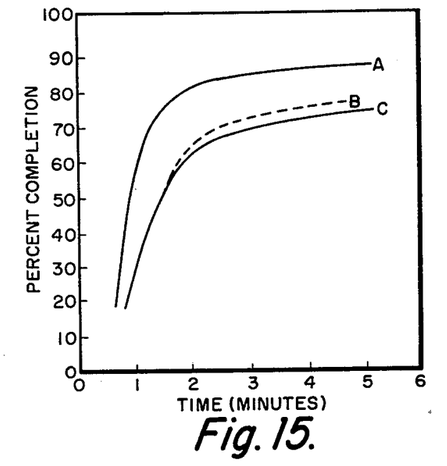
FIG. 15 shows that milling parameters affect reaction characteristics.

Other mill parameters such as speed of mill and ball size (milling energy) and ball to powder ratio contribute to the reaction characteristics. For a particular combination of anode and cathode materials and for a particular batch size these parameters can be optimized as shown in FIG. 15. Samples A. B and C of magnesium with 9.8 iron (Mg-9.8 Fe) alloy were prepared using different milling parameters. In FIG. 15 the parameters used for milling sample A were optimum for a magnesium anode material with 9.8 atomic percent iron.

Figure 6:
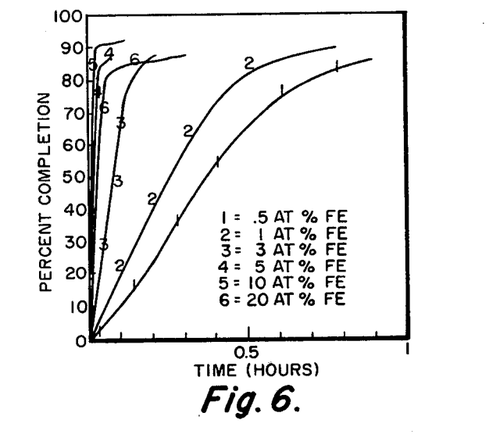
FIG. 6 are present completion time curves for a family of magnesium-iron mechanical alloys.

Magnesium alloys with different percentages of iron were prepared and tested; the results are plotted in FIG. 6. (Up to 10 percent iron, reaction rate increases with increasing iron content. Up to about 10 percent iron, the reaction is evidently limited by the amount of cathode present. Beyond 10 percent, the iron begins to mask active areas of the magnesium, reducing the reaction rate.) They show that the reaction rate depends strongly upon cathode material content up to approximately 10 atomic percent. Several tests of the alloy with 20 percent iron showed a significant decrease in the reaction rate. This phenomenon is believed to be caused by the reduction of exposed anode surface area due to the increased cathode content.

Cathodic percent does not appear to strongly affect the level of reaction completion. Thus, a particular alloy can be selected on the basis of reaction rate or on the basis of energy density. A summary of energy density and other characteristics of alloys tested is shown in Table I. The table shows that energy density (kJ/kg of alloy) decreases with increasing cathode content, while peak power increases.

TABLE I.

Characteristics of Various Alloys

| Alloy* | | Cathode content (% by weight) | Energy Density (kJ/kg) | Peak Power (W/gm) | Average Power** (W/gm) |
|---|---|---|---|---|---|
| 5 minutes | | 10.8 (Fe) | 13.3 | 4 | 3.7 |
| 15 minutes | | 10.8 (Fe) | 13.3 | 28 | 26.1 |
| 20 minutes | | 10.8 (Fe) | 13.3 | 83 | 60.9 |
| 0.5 | (Fe) | 1.1 | 14.8 | 6 | 5.6 |
| 1 | (Fe) | 2.3 | 14.6 | 8 | 8 |
| 3 | (Fe) | 6.6 | 14.0 | 31 | 20 |
| 5 | (Fe) | 10.8 | 13.3 | 220 | 69 |
| 10 | (Fe) | 20.3 | 11.9 | 279 | 114 |
| 20 | (Fe) | 36.5 | 9.5 | 76 | 51 |
| 1 | (Cu) | 2.6 | 14.6 | 6 | 2.9 |
| 3 | (Cu) | 7.5 | 13.8 | 14 | 6.4 |
| 5 | (Cu) | 12.1 | 13.2 | 22 | 10.7 |
| 10 | (Cu) | 22.5 | 11.6 | 35 | 18.7 |
| 5 | (Ti) | 9.4 | 13.6 | 2 | 1.5 |
| 5 | (Cr) | 10.1 | 13.4 | 4 | 3.8 |
| 5 | (C) | 2.5 | 14.6 | 9 | 4.4 |
| 5 | (Ni) | 11.3 | 13.3 | 163 | 100 |

*Identified by cathodic atomic percent or milling time
**Average power - energy liberated at t - (time to peak power) × 2 divided by t.

Stored strain energy from the milling process was thought to have an effect on the reaction. To test this idea, pure magnesium was milled and reacted. There was no significant difference between the reaction of milled and unmilled magnesium powders. Thus, the conclusion was reached that strain energy does not appreciably affect the reaction rate.

Figure 7:
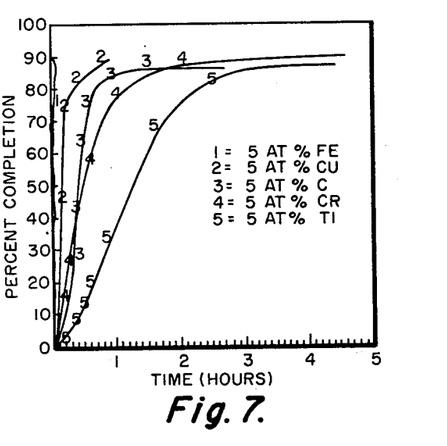
FIG. 7 shows the effect of cathode material on reaction rate for various mechanical alloys.

A small number of other alloys have been produced and evaluated. Some were magnesium based with a variety of cathodic materials; others were aluminum and zinc based. A family of percent completion curves for magnesium based alloys with 5 atomic percent, Cu, C, Cr, and Ti is shown in FIG. 7. (For a fixed cathode proportion, reaction rate is dependent on cathode material.) An alloy of 5 atomic percent nickel was tested and found to react similarly to the 5 percent iron. Carbon is also used the same as a passive cathodic metal in the alloy, as shown in Table I and FIG. 7, since carbon acts like a passive metal in galvanic cells. The mechanical alloy composition can be varied to adjust the corrosion rate.

The results of tests clearly show that iron and nickel are the most reactive of the cathode materials tested. Table I shows that 5 percent carbon has a slightly higher energy density than iron, but its power output is much lower.

Figure 8:
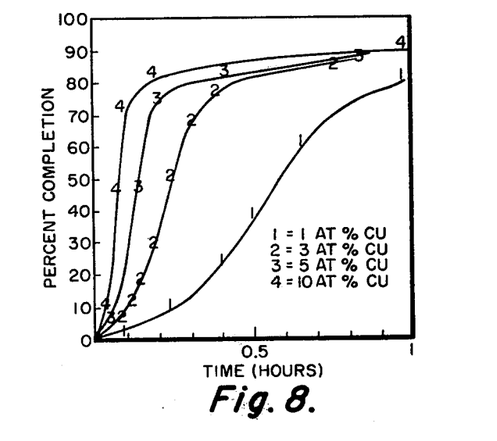
FIG. 8 are percent completion curves for various magnesium-copper mechanical alloys.
Figure 9:
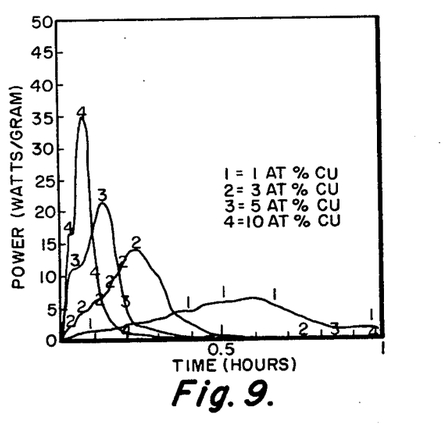
FIG. 9 shows power curves for magnesium-copper alloys.

To verify the dependence of the reaction process on cathode content (shown by the magnesium-iron alloys) a series of tests on magnesium-copper alloys was conducted. The results of the copper family tests are shown in FIGS. 8 and 9. (The time to reach a given percent completion varies approximately inversely with the amount of copper in the alloy. The effect of copper content is dramatically illustrated as doubled copper content results in approximately doubled peak power outputs, i.e, reaction rates.) FIG. 8 shows that the time to reach 50 percent completion is reduced by about half as the amount of copper is doubled. This geometric relationship is dramatically illustrated by the power curves of FIG. 9; peak power is approximately doubled as copper content is doubled.

Other alloys based on zinc and aluminum in place of magnesium have been fabricated and tested. The cathode materials were iron and copper. In seawater, none of these alloys showed a reactivity as great as the unalloyed base magnesium powder, so they have not been pursued further.

Figure 10:
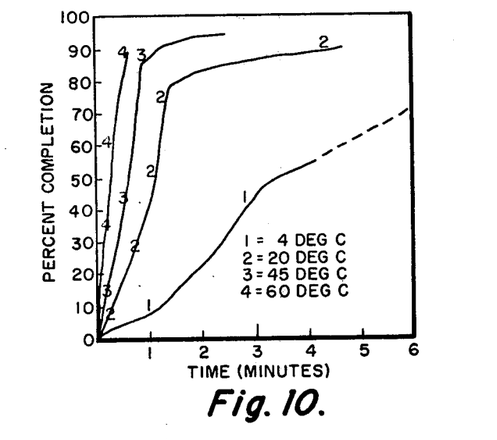
FIG. 10 shows typical percent completion curves for a particular alloy as a function of temperature.
Figure 11:
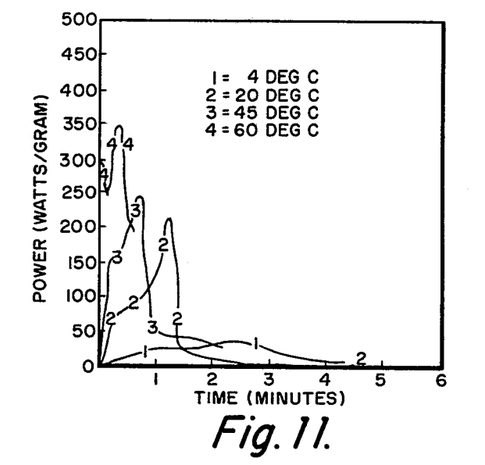
FIG. 11 are typical power curves for the FIG. 10 alloy as a function of temperature.

Tests were conducted to determine the effect of electrolyte temperature and ambient pressure on the reaction. For the temperature tests the seawater was preheated (or cooled) to the desired temperature before adding it to the alloy. The test results, plotted in FIGS. 10 and 11, show the reaction to be a strong function of the electrolyte temperature. Increasing the temperature increases the reaction rate. Peak power is strongly related to reaction temperature. Attempts were made to use starting temperatures above 60° C.; however, the reaction is so rapid that the bath could not maintain a constant temperature, and the seawater invariably boiled.

Samples of a magnesium based alloy with 9.8 atomic percent iron were compacted in the form of barstock (1.07 cm square by 6.5 cm long) and discs (1.27 cm dia by .32 cm thick). The completion was performed at 70, 140, 280, 420 and 550 M pascals. Some of the 550 M pascal samples were sintered at different temperatures and time of sinter; further samples were prepared using 500 M pascal compaction pressure and 700° F. 1 hour $CO_2$ atmosphere sinter conditions.

Figure 16:
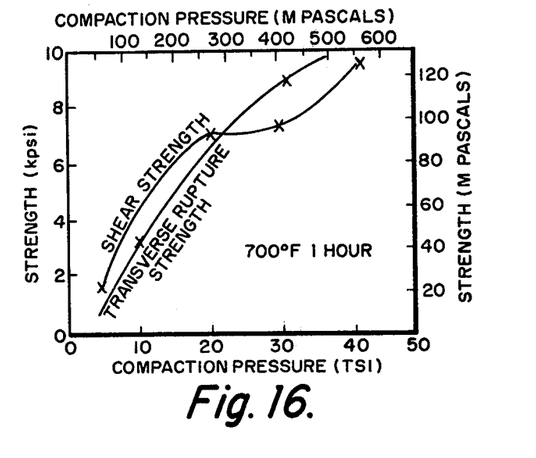
FIG. 16 shows the mechanical strength characteristics for Mg—9.8Fe alloy samples which were compacted at different pressures and sintered at 700° F. for one hour.

Testing of the sintered samples showed that tensile strength increases slightly with sinter temperature while shear strength peaks at 700° F. Time of sinter does not appear to effect the mechanical properties. As might be expected, mechanical strength increases with increasing compaction pressure as is shown in FIG. 16.

Figure 17:
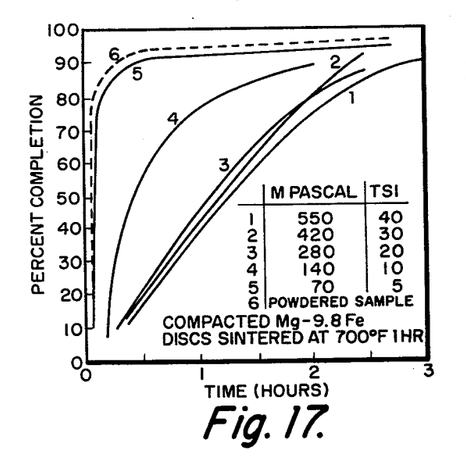
FIG. 17 shows the results of corrosion tests with discs made from the powdered alloy compacted at various pressures and then sintered where reaction rate is shown to decrease as compaction pressure increased.

Corrosion rate decreases with increasing compaction pressure as is shown in FIG. 17. This is to be expected since the compacted powdered alloy is more dense and less active surface area is available for corrosion.

Mechanical properties of several different magnesium based materials is shown in Table II below. Barstock samples of each material were tested to determine the time to tensile failure when a fixed tensile load was applied to the long axes of the bar. A 0.6 cm wide circumferential strip about the center of the bar was exposed to seawater. Also disc samples were tested to determine the corrosion rate of a flat surface as well as the reaction rate for each sample.

TABLE II.

Properties of Compacted* and Sintered* Alloys

| Alloy | Sintered PM No. | Sintered Density (g/cc) | Transverse Rupture Strength M Pascals | (kpsi) | Shear Strength M pascals | (kpsi) |
|---|---|---|---|---|---|---|
| Mg- .7 Fe | 1311 | 1.79 | 68.9 | (10) | 61.3 | (8.9) |
| Mg-1.6 Fe | 1308 | 1.81 | 64.8 | (9.4) | 59.3 | (8.6) |
| Mg-4.3 Fe | 1309 | 1.93 | 61.3 | (8.9) | 63.4 | (9.2) |
| Mg-9.8 Fe | 1306 | 2.10 | 71.7 | (10.4) | 66.8 | (9.7) |
| Mg-19 Fe | 1310 | 2.42 | 67.5 | (9.8) | 68.2 | (9.9) |
| Mg-4.3 Cu | 1312 | 1.87 | 44.1 | (6.4) | 50.3 | (7.3) |
| Mg-4.4 Ni | 1313 | 1.94 | 74.1 | (10.4) | 66.8 | (9.7) |
| Mg-4.3 C | 1314 | 1.78 | 88.9 | (12.9) | 65.5 | (9.5) |
| Mg-4.6 Ti | 1315 | 1.89 | 93.7 | (13.6) | 80.6 | (11.7) |

*Compacting pressure - 550 M pascals (40 TSI)
Sintered 700° F./1 hr./$CO_2$

Figure 18:
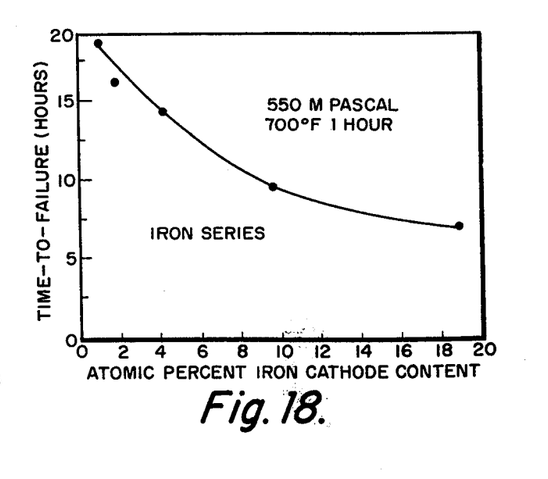
FIG. 18 shows the time to failure for sintered alloy barstock, where the time-to-failure decreased (i.e., reaction rate increased) with increasing cathode content for the iron series alloys.

FIG. 18 shows that time to corrosion failure decreases (or reaction rate increases) as the percent cathode content increases. For other cathode materials nickel reacted fastest, with iron, titanium, copper and carbon in decreasing order.

Figure 19:
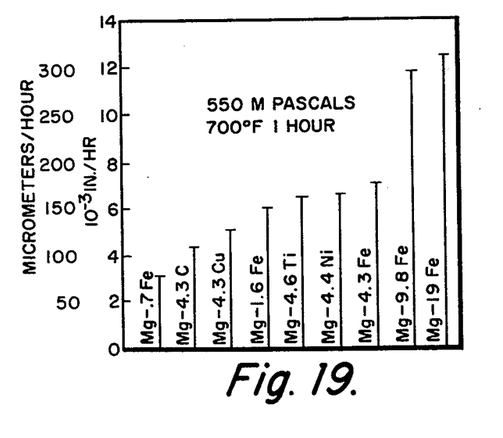
FIG. 19 shows a summary of surface corrosion rates for various samples tested.

Surface corrosion rates for all samples tested are shown in FIG. 19. As was expected from the results of previously discussed tests surface corrosion rate increases with increasing cathode content and varies with cathode type. Corrosion rates from 70 to over 300 micrometers per hour were obtained.

Supercorroding alloys were conceived as heat sources for use by divers. In this application it is essential to provide rapid generation of heat and high reaction efficiencies. The magnesium-iron alloys appear to be well suited for this task.

Figure 12:
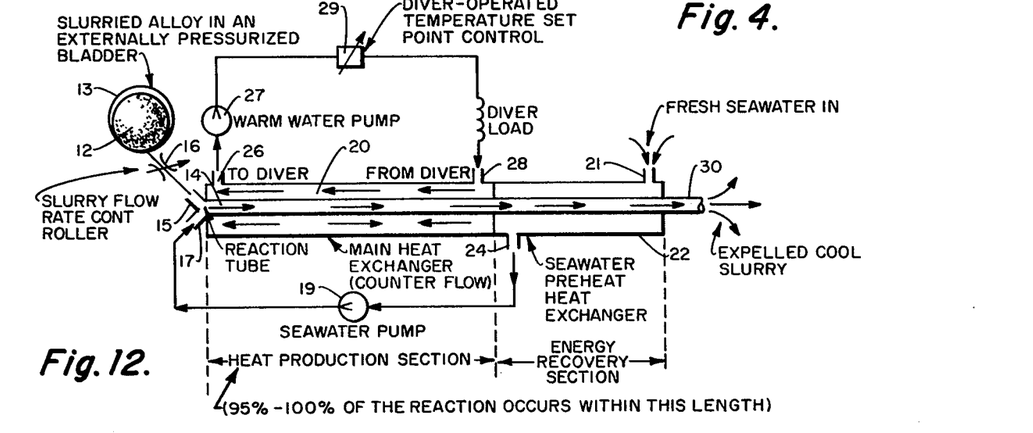
FIG. 12 is a diagrammatic illustration of an arrangement for a diver heater system utilizing supercorroding alloys of this invention as a heat source.

One configuration for a fuel-type heater using supercorroding alloys of this invention is shown in FIG. 12. In this system the powdered mechanical alloy 12 (i.e., galvanic cell composite particles) is slurried with inert ingredients which do not react with the components but which facilitate pumping the reactants to the electrolyte. An externally pressurized bladder 13, for example, (or other suitable slurry feed device) can be used to pump the slurried powdered alloy 12 into open-ended reaction tube 14 at 15 via a slurry flow rate controller 16. Approximately equal volumes of seawater and slurry are injected into reaction tube 14. Seawater is injected into tube 14 at 17 by means of seawater pump 19. The heat produced by the reaction of the powdered alloy with seawater is removed by the counterflow fluid in main heat exchanger tube 20 (i.e., heat production section) that surrounds tube 14. Fresh incoming seawater at inlet 21 is preheated in the seawater preheat exchanger 22 (i.e, energy recovery section) which is separated from main heat exchanger 20 by a partition. Reaction tube 14 passes through both heat exchanger sections 20 and 22. Cooled slurry is expelled at the opposite end as shown in the drawing. Fresh water is preheated by the expelled reactants and products in order to conserve energy. Preheated seawater is then pumped out from heat exchanger 22 at 24 and injected at inlet 17 into reaction tube 14. The rates at which the slurry and seawater are injected into reaction tube 14 can be varied to control the amount of heat generation. Water in main heat exchanger 20 which surrounds reaction tube 14 is heated by transfer of heat generated from the reaction of seawater with the slurried alloy. The heated fluid (e.g., water) is then circulated via outlet 26 through a water circulation garment, such as disclosed in aforementioned U.S. Pat. No. 3,884,216, worn by the diver (e.g., diver load) by means of warm water pump 27. Water from the diver's suit is then returned to the main heat exchanger 20 via inlet 28 for reheating. Control of heat in the diver's suit (i.e., rate of warm water circulation flow, etc.) is by means of a diver-operated temperature set point control 29, for example.

A typical inert slurry mixture fo facilitate the addition of the mechanical alloyed reactants to the electrolyte in a reaction chamber by pumping the inert slurry containing the powdered alloy through feed lines, for example, is given below:

| Constituent | Proportion (by weight) |
|---|---|
| Supercorroding alloy powder | up to 447.0 |
| Methoxy polyethylene glycol | 394.0 |
| N-oco beta amino butyric acid | 3.0 |
| Colloidal silica | at least 19.7 |
| Diethylenetriamine | 1.0 |

A preferred embodiment of the foregoing slurry was a completely inert gel like slurry containing in proportion by weight: magnesium-iron powder 447.0, methoxy polyethylene glycol, 394.0, N-oco beta amino butyric acid 3.0, colloidal silica 19.7, diethylenetriamine 1.0.

In slurry form, the powdered supercorroding reactants can be supplied to an electrolyte on a demand basis. By varying the slurry addition rate to a reaction chamber, power can be controlled.

Figure 13:
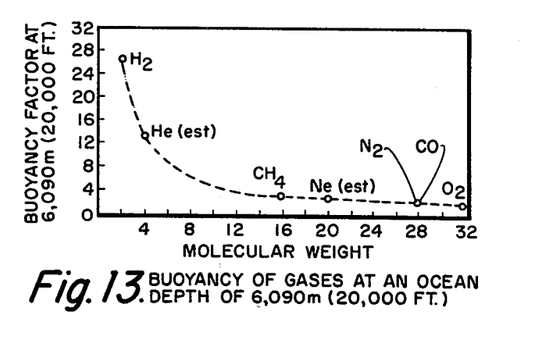
FIG. 13 shows the buoyancy of gases at an ocean depth of 6,090 meters.
Figure 14:
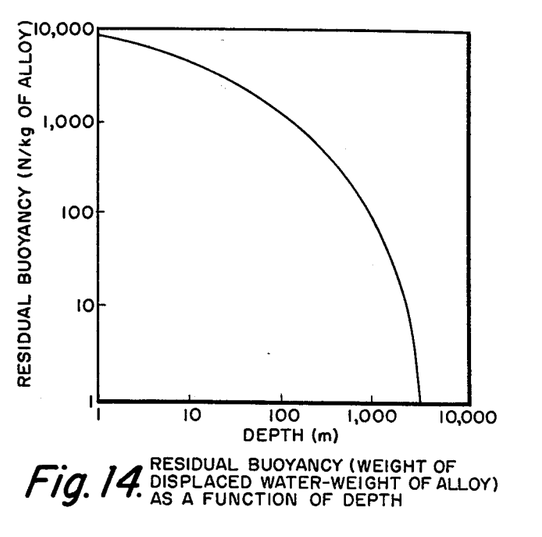
FIG. 14 is a curve showing buoyancy factor as a function of depth.

A second application for the supercorroding alloys is to produce hydrogen. Hydrogen can be used in either ocean buoyancy applications or for powering hydrogen-type fuel cells which produce electrical energy. Hydrogen is especially suited for buoyancy applications because of its low molecular weight. A comparison of the molecular weights and buoyancy factor (pounds of water displaced/pound of gas) is shown in FIG. 13. One kilogram (2.2 lbs) of 5 atomic percent magnesium-iron alloy is capable of producing 800 liters (28 ft$^3$) of hydrogen at STP in less than 5 minutes. The buoyancy factor (weight of seawater displaced to the weight of fuel) of this alloy is shown in FIG. 14.

There are many ways that supercorroding galvanic cell alloys can be used to produce hydrogen. If a totally controlled production rate is desired, a slurry metering system similar to the diver heater application could be used. For small buoyancy generators (less than 4500 N (1000 lbs)), gas could be generated by rupturing a plastic pouch containing the alloys. The pouch would be located below the container that collects the gas; this container would be attached to the object to be lifted.

Figure 20:
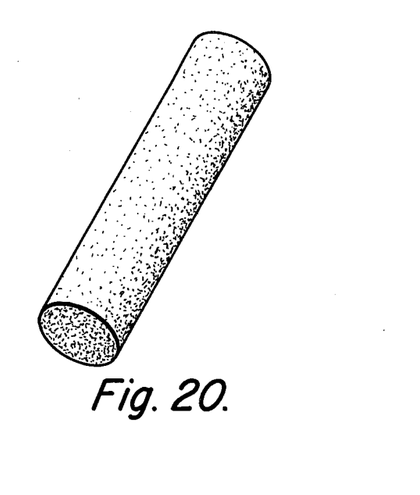
FIG. 20 shows a sample of sintered cylindrical rapidly corroding barstock.
Figure 21:
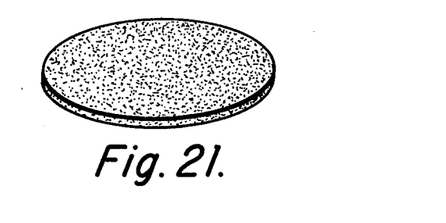
FIG. 21 shows a sintered rapidly corroding disc.
Figure 22:
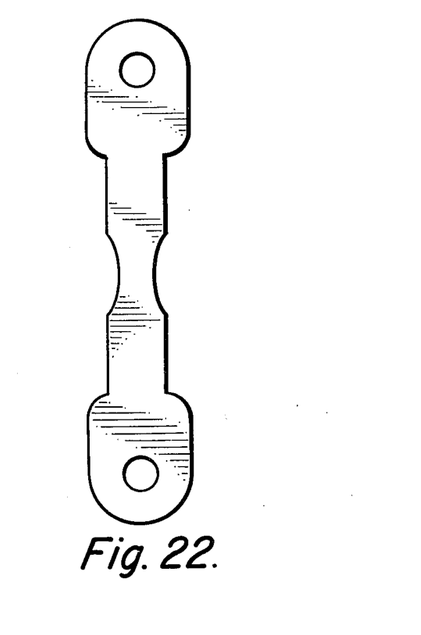
FIG. 22 shows a sintered rapidly corroding link.

Another application for the supercorroding galvanic cell alloys is in the construction of sintered self-destructing corroding links, dics, etc., as discussed above. For example, the alloy powders can be sintered to form barstock, such as shown in FIG. 20, suitable for making self-contained corroding links, or can be sintered to form corroding discs such as shown in FIG. 21. In many ocean engineering applications a timed release device is needed to shed temporary hydro-dynamic drag reduction shrouds or to aid in recovering instrumentation. The link can be in the form of a round pin which holds the object to be released to an anchor or instrument package. A variety of devices are presently used. Most of the devices are either not totally reliable or are extremely expensive. Prior art type corroding links require two separate parts (anode and cathode) that must be electrically connected to promote the link destruction. The electrical connections to the parts are often unreliable and break down. Since the supercorroding galvanic cell alloys are inherently self-destructing, the need for electrical connections is removed. Release times can be controlled either by sizing the dimensions of the supercorroding alloy or by selecting the alloy composition. Either way, a variety of corroding links, such as shown in FIG. 22 for example, that last for periods of minutes to hours can readily be manufactured using the present supercorroding galvanic cell alloys. In the disc form, as in FIG. 21, for example, one surface is exposed to the ambient seawater. When mounted on a device, upon immersion the surface will corrode and the disc will eventually fail. The failure can be used to facilitate flooding and scuttling or to activate other mechanical and electrical functions. If desired, barstock, such as in FIG. 20, for example, or pre-formed links such as in FIG. 22 can be coated with an epoxy except for a circumferential area about the center to preclude seawater contact from all but the exposed center area.

Desirable failure time for corrodable linkage devices varies depending on the application. For example, it may be desired to retrieve a sampling device within one to eight hours of deployment. In another application, it may be desirable to scuttle a surface float such as a sonobuoy after eight to ten days of operation.

As a heat source, the alloys can be used to warm divers or melt ice in arctic regions. The hydrogen produced can be used to power fuel cells and internal combustion engines, or to provide buoyancy for lifting heavy objects from the ocean floor.

Supercorroding alloys have advantages over the prior art type fixed-plate cells and mini-cells in diver heating applications. They are at least an order of magnitude more reactive than either the fixed-plate cell or the mini-cells. They are independent of external electrical resistance and internal electrical resistance is minimal. They are significantly more efficient than the previous type powdered mini-cells and have a much greater energy density than the fixed-plate cells. Reaction rates can be selected by choosing the composition of the alloy. The output of hydrogen produced can be varied by controlling either the reaction temperature or the metering rate of the alloy to a reaction chamber.

By forming a wide variety of alloys, a range of reaction rates can be obtained. Alloys can be chosen for use by matching their reaction rates to the application: high rates are suitable for heat and gas generation; low, steady, predictable rates are suited to corroding links.

Obviously many modifications and variations of the present invention are possible in the light of the above teachings. It is therefore to be understood that within the scope of the appended claims the invention may be practiced otherwise than as specifically described.

We claim:

1. Supercorroding galvanic cell alloys for generating heat and hydrogen gas upon activation in an electrolyte, comprising:
    a. uniform mechanical alloy produced by the repeated flattening, fracturing and cold welding together of active anodic powered metal and passive cathodic powdered material constituents in an inert atmosphere to form minute mechanically alloyed composite galvanic cell particles of completely homogeneous mixture;
    b. said anodic and cathodic powdered particles being substantially atomically clean and absent of oxides on their surfaces and being coupled into micro-cells having strong mechanical bonds and intimate atomic-level electrical contact; said micro-cells having extremely short current path lengths between the alloyed constituents;
    c. said anodic powdered metal and passive cathodic powdered material being mechanically alloyed to a point substantially less than saturation hardness for providing desired homogeneity and optimum reaction time in said electrolyte;
    d. each of said uniform mechanically alloyed galvanic cell particles consisting of an active anodic metal matrix having numerous smaller particles of passive cathodic material trapped and dispersed throughout said active anodic metal matrix in a characteristic homogeneous layered structure;
    e. said active anodic metal being powdered magnesium;
    f. said passive cathodic powder material being selected from any of iron, copper, titanium, chromium, carbon, and nickel, including combinations thereof;
    g. said mechanically alloyed galvanic cell particles being operable to corrode at a predictable and rapid rate in a desired electrolyte for producing heat and gas by proper selection of constituents and percentages thereof and the homogeneity of the alloy; said mechanically alloyed galvanic cell particles having optimum electrical contact between active and passive material and no electrode gap to maintain resulting in minimal internal electrical resistance and improved reaction rates in suitable electrolyte; wherein maximum corrosion rate and efficiency is provided with minimum electrolyte bath length, high exposed surface area ratio, strong welded bonds and less than $10^{-4}$ ohms resistance for external currents to flow through between the corroding cathode and anode material pairs of the supercorroding galvanic cell alloyed particles.

2. Supercorroding galvanic cell alloys as in claim 1 wherein said active metal powder consists of from approximately 80 to 95 atomic percent powdered magnesium particles.

3. Supercorroding galvanic cell alloys as in claim 1 wherein said passive material powder consists of from approximately 0.5 to 20 atomic percent powdered iron particles.

4. Supercorroding galvanic cell alloys as in claim 1 wherein said passive material powder consists of from 1 to 10 atomic percent powdered copper particles.

5. Supercorroding galvanic cell alloys as in claim 1 wherein said passive material powder consists of up to approximately 5 atomic percent powdered titanium particles.

6. Supercorroding galvanic cell alloys as in claim 1 wherein said passive material powder consists of up to approximately 5 atomic percent powdered chromium particles.

7. Supercorroding galvanic cell alloys as in claim 1 wherein said passive material powder consists of up to approximately 5 atomic percent powdered carbon particles.

8. Supercorroding galvanic cell alloys as in claim 1 wherein said passive material powder consists of up to approximately 5 atomic percent powdered nickel particles.

9. Supercorroding galvanic cell alloys as in claim 1 wherein said passive material powder consists of up to approximately 20 atomic percent of a mixture of a plurality of said passive material powders.

10. Supercorroding galvanic cell alloys as in claim 1 wherein said mechanically alloyed galvanic cell particles are refined by continued milling thereof from approximately 5 to 30 minutes.

11. Supercorroding galvanic cell alloys as in claim 1 wherein preferred particle size of refined milled mechanically alloyed galvanic cell particles is between 80 and 100 mesh.

12. Supercorroding galvanic cell alloys as in claim 1 wherein the largest dimension of the passive material particles dispersed throughout said active metal matrix is approximately 30 microns.

13. Supercorroding galvanic cell alloys as in claim 1 wherein the generation of hydrogen produced upon activation of said powdered galvanic cell alloyed particles in an electrolyte is varied by controlling either the reaction temperature or the rate at which the galvanic cell alloyed particles are added to the electrolyte.

14. Supercorroding galvanic cell alloys as in claim 1 wherein said powdered mechanically alloyed galvanic cell particles are molded into desired shapes, compacted and sintered to form self-destructible articles for use in a suitable electrolyte.

15. A supercorroding alloy as in claim 14 molded, compacted and sintered into a rapidly corrodable link.

16. A supercorroding alloy as in claim 14 molded, compacted and sintered into a rapidly corrodable disc.

17. Supercorroding galvanic cell alloys as in claim 1 wherein the preferred atomic percent of iron is from 5 to 10.

18. Supercorroding galvanic cell alloys as in claim 1 wherein the optimum milling time for alloying the material powders into galvanic cell composite particles is approximately 30 minutes.

19. Supercorroding galvanic cell alloys as in claim 1 wherein inert ingredients are mixed with said mechanically alloyed particles to form an inert slurry of gel type consistency which facilitates pumping thereof.

20. Supercorroding galvanic cell aloys as in claim 19 wherein said slurry consists in proportion by weight of: magnesium based mechanically alloyed powder 447.0, methoxy polyethylene glycol 394.0, N-oco beta amino butyric acid 3.0, collodial silica at least 19.7, diethylenetriamine 1.0.

* * * * *